US010218579B1

(12) United States Patent
Ni et al.

(10) Patent No.: US 10,218,579 B1
(45) Date of Patent: Feb. 26, 2019

(54) TENSOR-BASED FRAMEWORK FOR ANALYZING HIGH VELOCITY LARGE-SCALE NETWORK ACTIVITIES TO INFER LATENT MESOSTRUCTURES AND IMPORTANT NODES

(71) Applicant: HRL Laboratories, LLC, Malibu, CA (US)

(72) Inventors: Kang-Yu Ni, Calabasas, CA (US); Jiejun Xu, Chino, CA (US)

(73) Assignee: HRL Laboratories, LLC, Malibu, CA (US)

( * ) Notice: Subject to any disclaimer, the term of this patent is extended or adjusted under 35 U.S.C. 154(b) by 188 days.

(21) Appl. No.: 15/431,165

(22) Filed: Feb. 13, 2017

Related U.S. Application Data

(60) Provisional application No. 62/294,306, filed on Feb. 12, 2016.

(51) Int. Cl.
*H04L 12/24* (2006.01)
*G06N 5/04* (2006.01)
*G06F 17/16* (2006.01)

(52) U.S. Cl.
CPC .............. *H04L 41/14* (2013.01); *G06F 17/16* (2013.01); *G06N 5/04* (2013.01)

(58) Field of Classification Search
None
See application file for complete search history.

(56) References Cited

PUBLICATIONS

Kleinberg, Jon M. "Authoritative sources in a hyperlinked environment." Journal of the ACM (JACM) 46.5 (1999): pp. 604-632.
Kolda, Tamara, and Brett Bader. "The TOPHITS model for higher-order web link analysis." Workshop on link analysis, counterterrorism and security. vol. 7. 2006.
Szabo, Gabor, and Bernardo A. Huberman. "Predicting the popularity of online content." Communications of the ACM 53.8 (2010): pp. 80-88.
Castillo, C., El-Haddad, M., Pfeffer, J., & Stempeck, M. "Characterizing the life cycle of online news stories using social media reactions." Proceedings of the 17th ACM conference on Computer supported cooperative work & social computing. ACM, 2014. ACM, 2014, pp. 211-223.
Kao, A., Ferng, W., Poteet, S., Quach, L., & Tjoelker, R. "TALISON—Tensor analysis of social media data." Intelligence and Security Informatics (ISI), 2013 IEEE International Conference on. IEEE, 2013, pp. 137-142.

(Continued)

*Primary Examiner* — Alicia Baturay
(74) *Attorney, Agent, or Firm* — Tope-McKay & Associates

(57) ABSTRACT

Described is a system for analyzing network activities. Each pair of node interactions between nodes in the network is represented with a tensor. For each pair of node interactions, a mesostructure is inferred using tensor decomposition of the tensor, resulting in inferred mesostructures. A temporal network structure representing each pair of node interactions is determined using a set of parameters generated from the tensor decomposition, resulting in temporal network structures. A future data cascade in the network is predicted using the temporal network structures.

18 Claims, 5 Drawing Sheets

(56) References Cited

PUBLICATIONS

Gao, Sheng, Ludovic Denoyer, and Patrick Gallinari. "Link pattern prediction with tensor decomposition in multi-relational networks." Computational Intelligence and Data Mining (CIDM), 2011 IEEE Symposium on. IEEE, 2011, pp. 1-8.

Gauvin, L., Panisson, A., Barrat, A., & Cattuto, C. "Revealing latent factors of temporal networks for mesoscale intervention in epidemic spread." arXiv preprint arXiv:1501.02758(2015), pp. 1-17.

Brett W. Bader, Tamara G. Kolda and others. MATLAB Tensor Toolbox Version 2.6, Downloaded Feb. 2015. URL: http://www.sandia.gov/~tgkolda/TensorToolbox/.

Jiejun Xu, Ryan Compton, Tsai-Ching Lu, David Allen, Rolling through Tumblr: Characterizing Behavioral Patterns of the Microblogging Platform, ACM Web Science (WebSci), 2014, pp. 13-22.

Kolda, Tamara G., and Brett W. Bader. "Tensor decompositions and applications." SIAM review 51.3 (2009): pp. 455-500.

Hethcote, Herbert W. "The mathematics of infectious diseases." SIAM review 42.4 (2000): pp. 599-653.

TENSOR-BASED FRAMEWORK FOR ANALYZING HIGH VELOCITY LARGE-SCALE NETWORK ACTIVITIES TO INFER LATENT MESOSTRUCTURES AND IMPORTANT NODES

CROSS-REFERENCE TO RELATED APPLICATIONS

This is a Non-Provisional Application of U.S. Provisional Application No. 62/294,306, filed in the United States on Feb. 12, 2016, entitled, "A Tensor-Based Framework for Analyzing High Velocity Large-Scale Network Activities to Infer Latent Mesostructures and Important Nodes," the entirety of which is incorporated herein by reference.

BACKGROUND OF INVENTION

(1) Field of Invention

The present invention relates to a system for analyzing high velocity large-scale network activities and, more particularly, to a system for analyzing high velocity large-scale network activities based on tensors.

(2) Description of Related Art

High velocity network activities often contain complicated interaction patterns that can be arbitrary, heterogeneous, and of high volume. Therefore, it is difficult to capture interaction patterns and find underlying network structure. Kleinberg introduced the HITS algorithm (Hyperlink-Induced Topic Search) for discovering authoritative sources in a hyperlinked environment, such as the World Wide Web (see Literature Reference No. 1 in the List of Incorporated Literature References). The approach is global in the sense that it identifies the most central pages for broad search topics in the context of the World Wide Web. The entire set of pages relevant to a broad topic query can have a size in the millions. The method disclosed in Literature Reference No. 1 uses a graph representation where each website is a node and each hyperlink is a directed edge. The graph is represented as a sparse adjacency matrix. The singular value decomposition (SVD) is then applied to the matrix to reveal topic components and their hub scores, and authority scores for all websites.

Kolda and Brett (see Literature Reference No. 2) proposed the TOPHITS (Topical HITS) method that uses a higher-order analogue of the matrix SVD called the PARAFAC model to analyze three-way representation of web data. Adding a third dimension to form an adjacency tensor allows incorporation of information about terms or topics. This not only reveals latent groupings of websites, but also includes latent term information. Both Literature Reference Nos. 1 and 2 attempt to find latent groupings of websites but do not explore the settings where the temporal aspect of node interactions is present.

Additionally, Szabo et al. (see Literature Reference No. 3) presented a method for predicting the long-term popularity of online content based on early measurements of user access. They demonstrated, on two popular content-sharing portals, Digg and YouTube, that by modeling the accrual of votes on the views of content, one can predict the dynamics of individual submissions from initial data. In Digg, measuring access to given stories during the first two hours after posting can forecast a story's popularity 30 days ahead with a small error, while downloads of YouTube videos had to be followed for 10 days. Their method used the linear regression method on the logarithmically transformed submission popularities to extrapolate the early patterns for future access rates prediction.

Further, Castillo et al. (see Literature Reference No. 4) studied the life cycle of online news articles and the interplay between website visitation patterns and social media reactions to new contents. Their method can help gain a better understanding of how people consume different types of news online. They use linear models to demonstrate the importance of social media signals for the prediction. Both Literature Reference Nos. 3 and 4 attempted to predict popularities of individual online contents/articles with linear regression models, but do not try to discover how users (nodes) interact with one another and how the interactions affect the popularity prediction.

Kao et al. (see Literature Reference No. 5) proposed a tensor analysis of latent interactions in social online networks (TALISON) to provide a model that simultaneously represents social relationships and the evolution of topics. Their analysis of Twitter data can both identify salient events and distinguish important views of these events. The dimensions of their tensor model are hashtags, terms, users, and time. The model has the strength of extracting detailed information for analysts with a significant topic in mind (such as the case of the Occupy movement), but is not able to handle data at the Internet scale.

In addition, Gao et al. (see Literature Reference No. 6) used third-order tensors and tensor decomposition to predict links of multiple types. Each slice with a fixed third dimension variable is a graph adjacency matrix with a specific type of relation (e.g., email adjacency relation, email co-receiver relation, email co-sender relation, email carbon copy (CC) receivers relation, job position relation). Via canonical polyadic (CP) tensor decomposition, CP can jointly model the multi-relational data and capture the correlations between multiple relation types. Gao et al. explored the effect of various relation types on prediction performance using a YouTube dataset. The YouTube dataset contained five relation types among which contact relation is the sparsest, while the other relations are denser. The authors discovered that the favorite relation helped boost the performance significantly, while the contact relation had the least impact on the results. However, they also did not explore the temporal aspect of node interactions.

Furthermore, Gauvin et al. (see Literature Reference No. 7) tackled the problem of designing interventions that selectively target the mesoscopic structure of a temporal network with the goal of controlling a dynamical process, such as epidemic spread. The authors detected mesostructures of a temporal network and ranked them by their importance for a specific dynamical process. They demonstrated on high-resolution social network data on face-to-face interactions in a school setting, with 231 children and 10 teachers, organized in 10 classes. By using non-negative tensor factorizations of interactions between children and teachers, the authors were able to reveal the 10 school classes and 4 groups of individuals from different classes that were only active during lunch breaks. However, the network size of their demonstration was very small (tensor dimension was 241×241×70 (a three-dimensional array)), and the interaction patterns were quite structured due to the school setting.

Understanding large-scale network activities without given knowledge (such as filter, keywords, or contents) is challenging because there can be a huge number of different events happening in parallel, and there may not be any constraints on how nodes should interact with one another.

Therefore, there may not be obvious patterns. Discovering the network structure becomes extremely difficult when the scale of the network is large, because nodes can be interconnected with overlapping latent structures and different kinds of temporal patterns. Therefore, a continuing need exists for a system for applying tensor analysis to complicated data.

SUMMARY OF INVENTION

The present invention relates to a system for analyzing high velocity large-scale network activities and, more particularly, to a system for analyzing high velocity large-scale network activities based on tensors. The system comprises one or more processors and a memory having instructions such that when the instructions are executed, the one or more processors perform multiple operations. Each pair of node interactions between nodes in the network is represented with a tensor, wherein the nodes represent users in the network. For each pair of node interactions, a mesostructure is inferred using tensor decomposition of the tensor, resulting in a plurality of inferred mesostructures. A temporal network structure representing each pair of node interactions is determined using a set of parameters generated from the tensor decomposition, resulting in a plurality of temporal network structures. At least one future data cascade in the network is predicted using the plurality of temporal network structures.

In another aspect, the network is a social network, and wherein the one or more processors further perform an operation of analyzing data generated by social network activities of users of the social network to predict future data spread in the social network.

In another aspect, a set of node interactions between N nodes is converted into an N×N adjacency matrix with an $ij^{th}$ entry representing a number of times data propagates from a node i to a node j; the adjacency matrix is rescaled; a singular value decomposition is applied to the rescaled adjacency matrix to approximate the rescaled adjacency matrix as a sum of rank-1 matrices; and a subset of nodes $\tilde{N}$ in the network having the highest percentage of node interactions is identified.

In another aspect, an $\tilde{N} \times \tilde{N} \times T$ tensor $\mathcal{T}$ of node interactions is generated, wherein a tensor $\mathcal{T}_{ijk}$ represents a number of times data propagates from node i to node j during time interval k, and T is a total number of time intervals; rescaling the tensor $\mathcal{T}$. Rank-1 tensor decomposition is applied to the rescaled tensor $\tilde{\mathcal{T}}$ to approximate the rescaled tensor $\tilde{\mathcal{T}}$ as a sum of rank-1 tensors.

In another aspect, each inferred mesostructure provides a score of each node as a source node and as a distributor node, wherein a source node represents a creator of new data, and a distributor node represents a propagator of the new data.

In another aspect, the system generates a cascade prediction model based on at least one of the plurality of inferred mesostructures.

In another aspect, the system identifies at least one top node in the network, and influences the user associated with the at least one top node to advocate a commercial product to other users in the network.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
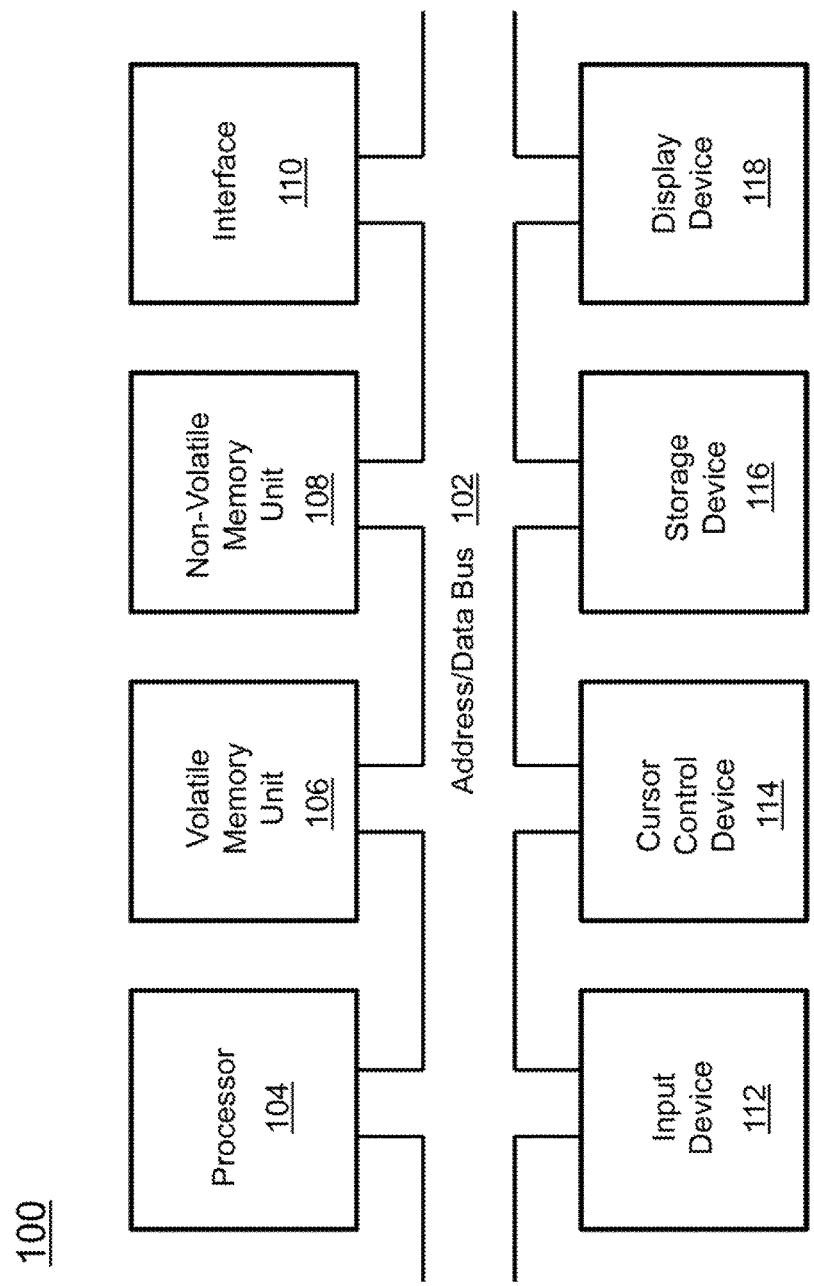
FIG. 1 is a block diagram depicting the components of a system for analyzing high velocity large-scale network activities according to some embodiments of the present disclosure.

The present invention relates to a system for analyzing high velocity large-scale network activities and, more particularly, to a system for analyzing high velocity large-scale network activities based on tensors. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35

U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. Kleinberg, Jon M. "Authoritative sources in a hyperlinked environment." Journal of the ACM (JACM) 46.5 (1999): 604-632.
2. Kolda, Tamara, and Brett Bader. "The TOPHITS model for higher-order web link analysis." Workshop on link analysis, counterterrorism and security. Vol. 7. 2006.
3. Szabo, Gabor, and Bernardo A. Huberman. "Predicting the popularity of online content." Communications of the ACM 53.8 (2010): 80-88.
4. Castillo, C., El-Haddad, M., Pfeffer, J., & Stempeck, M. "Characterizing the life cycle of online news stories using social media reactions." Proceedings of the 17th ACM conference on Computer supported cooperative work & social computing. ACM, 2014.
5. Kao, A., Ferng, W., Poteet, S., Quach, L., & Tjoelker, R. "TALISON-Tensor analysis of social media data." Intelligence and Security Informatics (ISI), 2013 IEEE International Conference on. IEEE, 2013.
6. Gao, Sheng, Ludovic Denoyer, and Patrick Gallinari. "Link pattern prediction with tensor decomposition in multi-relational networks." Computational Intelligence and Data Mining (CIDM), 2011 IEEE Symposium on. IEEE, 2011.
7. Gauvin, L., Panisson, A., Barrat, A., & Cattuto, C. "Revealing latent factors of temporal networks for mesoscale intervention in epidemic spread." arXiv preprint arXiv:1501.02758 (2015).
8. Brett W. Bader, Tamara G. Kolda and others. MATLAB Tensor Toolbox Version 2.6, Available online, February 2015.
9. Jiejun Xu, Ryan Compton, Tsai-Ching Lu, David Allen, Rolling through Tumblr: Characterizing Behavioral Patterns of the Microblogging Platform, ACM Web Science (WebSci), 2014.
10. Kolda, Tamara G., and Brett W. Bader. "Tensor decompositions and applications." SIAM review 51.3 (2009): 455-500.
11. Hethcote, Herbert W. "The mathematics of infectious diseases." SIAM review 42.4 (2000): 599-653.

(2) PRINCIPAL ASPECTS

Various embodiments of the invention include three "principal" aspects. The first is a system for analyzing high velocity network activities. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100.

In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
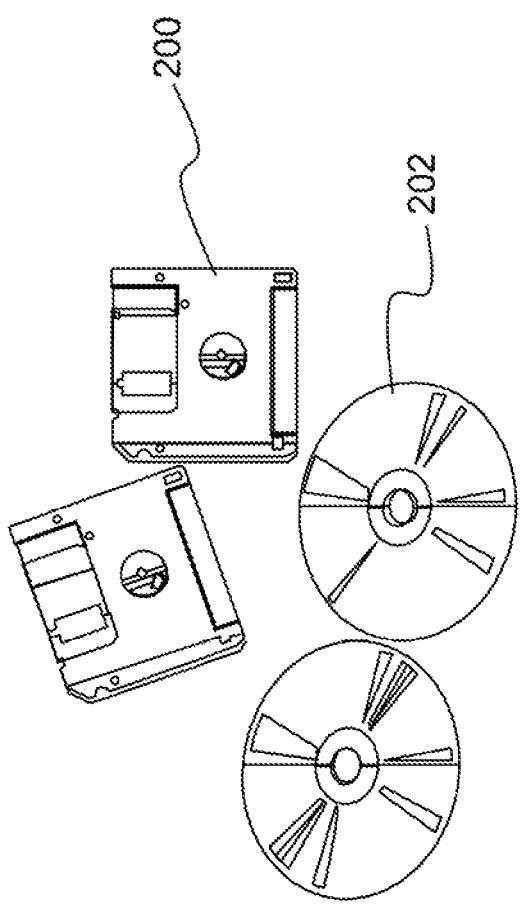
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION

Described is a unique framework based on tensors to analyze high velocity large-scale network activities (such as data being generated and moved around) and interactions between nodes of a network without the need to extract specific contents and contexts of the data nor to aggregate the interactions over time. High velocity network activities (i.e., data being generated at increasing speeds (e.g., millions of rows of data per second)) often contain complicated interaction patterns that can be arbitrary, heterogeneous, and of high volume. Therefore, it is difficult to capture interaction patterns and find underlying network structure. The system according to embodiments of the present disclosure is a unified method using tensors to capture temporal and spatial patterns. A tensor is an array of components that are functions of the coordinates of a space, such as a network structure. The interactions (either undirectional or directional) between nodes of the network at certain time are expressed with a tensor. Within the framework described herein, rank-one decomposition of the tensor is employed to reveal important spatial (i.e., content) and temporal structure of the network. Based on the inferred temporal network structure, a link evolving model was developed that predicts the cascades of individual pieces of data (e.g., signals, other information).

In one embodiment, the invention described herein provides a method to make sense of large amounts of data generated by network activities (e.g., social media network activities) and draw insights from the activities. As described above, the system according to embodiments of the present disclosure finds the temporal structure of the interactions and the important nodes without supervision. The inferred mesostructures (which are an intermediate scale of the network structure) from tensor decompositions provide the importance of each node as a source and as a distributor for each component, as well as the activity levels of that mesostructure (e.g., how much data is generated and how much data is being moved around). A source is the source of data being generated, and a distributor distributes data to other nodes. The cascades prediction model described herein is based on the mesostructures and goes beyond state-of-the-art trending methods that are based on regression analysis.

The method described herein enables analysis of high velocity large-scale network activities and inference of evolving links between nodes of the network. Links here are an abstraction of how data moves and how information spreads. The challenge of making sense of the complicated interactions between nodes in a large network is that there are a large number of events (different threads/posts) taking place in parallel.

Figure 3A:
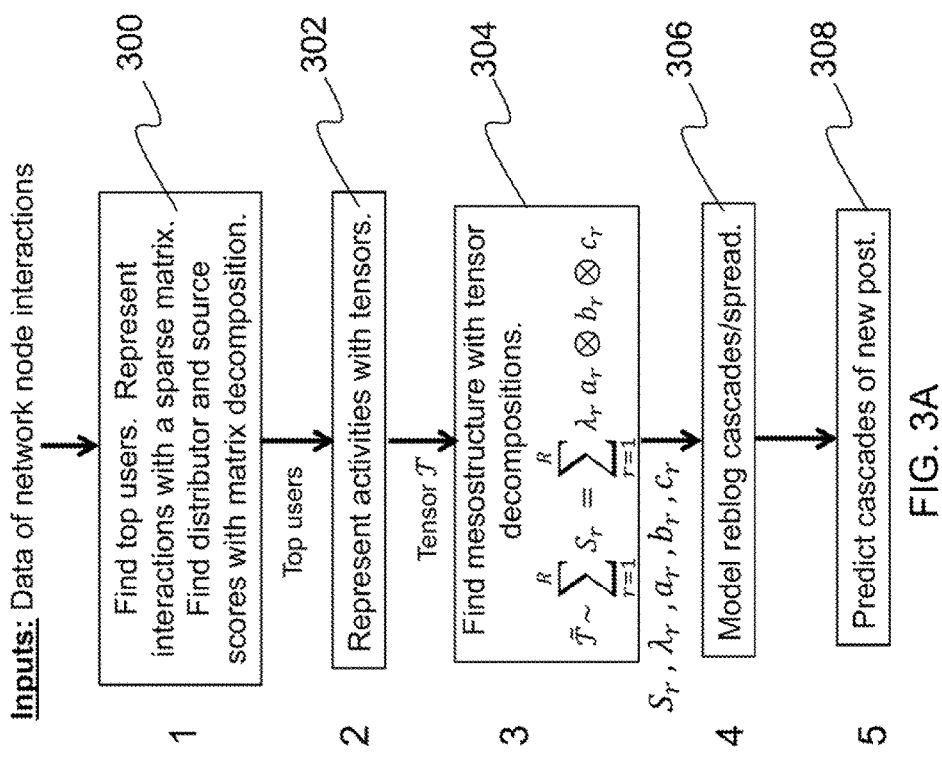
FIG. 3A is a flow diagram illustrating a system for analyzing high velocity large-scale network activities according to some embodiments of the present disclosure.

To address this problem, the method first narrows down the network space by finding the top nodes representing the top users, as depicted in FIG. 3A, using a graph adjacency matrix representation and matrix decomposition (element 300). Each entry in the matrix is the number of times information propagates from node i to node j. There is a matrix for all nodes in the network. Each matrix entry represents a pairwise interaction. The matrix decomposition generates source scores and also distributor scores for each node. This process acts to find the important nodes (i.e., users) in the network. Then, the activities of the top users are represented with tensors (element 302). Each entry of the tensor is the number of times information propagates from node i to node j at time interval k. This process does not flatten the activities over time, as a matrix does. From an adjacency tensor of important/top users, mesostructures are found (element 304). An adjacency tensor describes which nodes are adjacent to which other nodes. These are the network structures at the intermediate scale, between micro network structures and macro network structures. The mesostructures are found using rank-1 tensor decompositions. Below is a detailed description of the method according to embodiments of the present disclosure.

(3.1) Methodology

Inputs:

The input data is a list of how nodes interact with one another, which contain the source node, the distributor node, and the time at which a piece of information/data, or signals, are spread from the source node to the distributor node. The source node represents the creator of new data/post, while the distributor node represents the propagator of the new data/post.

Steps:
1. Find top/key nodes (element 300 of FIG. 3A). The purpose of this step is to reduce the size of the data to be processed. This is preferred for large-scale networks (e.g., millions of nodes). Non-limiting examples of large-scale networks include social media user interaction networks, such as Tumblr® and Twitter®. First, the list of interactions with N nodes is converted into a sparse N×N adjacency matrix M with $ij^{th}$ entry the number of times a piece of information propagated from node i to node j. The diagonal entries of matrix M are set to be zero in order to eliminate the possibility that a node self-references itself. Therefore, the graph that is represented by the adjacency matrix M has no self-loops. Then, matrix M is rescaled by $\tilde{M}_{ij}=1+\log(M_{ij})$ for nonzero entries $M_{ij}\neq 0$. Singular value decomposition (SVD) is then applied, which approximates the matrix $\tilde{M}$ as a sum of rank-1 matrices:

$$\tilde{M} \sim \sum_{r=1}^{R} \lambda_r a_r \otimes b_r,$$

where $a_r$ and $b_r$ are unit-norm vectors of length N, $\lambda_r$ is the corresponding singular value, and ⊗ represents an outer product. R denotes an integer that represents the number of rank-1 matrices (or the number of mesostructures). For each component r, vector $a_r$ represents the source scores of individual nodes, and vector $b_r$ represents the distributor scores of individual nodes. The source scores for individual nodes are the weighted sum of the source scores over all components as follows:

$$\sum_{r=1}^{R} \lambda_r a_r.$$

The distributor scores for individual nodes are the weighted sum of the distributor scores over all components as follows:

$$\sum_{r=1}^{R} \lambda_r b_r.$$

The top nodes are then selected according to the nodes with the highest x % source scores or distributor scores. A top node can be either a top source or a top distributor.

2. Represent interactions with tensors (element 302 of FIG. 3). From the selected Ñ top nodes, the system then builds a Ñ×Ñ×T tensor $\mathcal{T}$ of the interactions, where $\mathcal{T}_{ijk}$ is the number of times a piece of information propagated from node i to node j during time interval k, and T is the total time intervals. The diagonal entries of tensor slices for all t=1, 2, . . . , T are set to be zero to eliminate the possibility that a node self-references itself. Thus, the temporal graph that is represented by the tensor $\mathcal{T}$ has no self-loops. Then, tensor $\mathcal{T}$ is rescaled by $\tilde{\mathcal{T}}_{ijk}=1+\log(\mathcal{T}_{ijk})$ for nonzero entries $\mathcal{T}_{ijk}\neq 0$.

3. Find mesostructure of interactions with tensor decompositions (element 304 of FIG. 3). Rank-1 tensor decomposition (also termed canonical polyadic decomposition (CP) or parallel factors (PARAFAC)), is applied to approximate the tensor $\tilde{\mathcal{T}}$ as a sum of rank-1 tensors:

$$\tilde{\mathcal{T}} \sim \sum_{r=1}^{R} S_r = \sum_{r=1}^{R} \lambda_r a_r \otimes b_r \otimes c_r,$$

where $a_r$, $b_r$ and $c_r$ are unit-norm vectors of length Ñ and $\lambda_r$ is the corresponding singular value. For each component r, vector $a_r$ represents the source scores of individual nodes, vector $b_r$ represents the distributor scores of individual nodes, and vector $C_r$ represents the interaction levels over time of each component. See Literature Reference No. 10 for a description of rank-1 tensor decomposition.

Outputs:

$S_r$, $\lambda_r$, $a_r$, $b_r$, $c_r$, r=1, . . . , R.

4. To model how an individual piece of information propagates, one can further use the above outputs as parameters for the temporal network whose edges represent (stochastic) interactions aggregated over all information propagation (element 306 of FIG. 3). The propagation of individual pieces of information are used as training data, and the system learns the contagion parameters, such as spread rate and cure rate. In other words, for a contagion model, the system identifies the parameters that describe the training data. The contagion parameters can be learned from the training data. A set of training data consists of how an individual piece of information (for example, a Tumblr® post created by a user) spreads over a network. From an initial post at time=0, the probability of the post being spread (spread rate) is determined by calculating the fraction of users who reblog the post from one of their network neighbor users. From this fraction (spread rate), then the fractions of users who reblog the post from one of their network neighbor users after time t, where t=1, 2, 3, 4, 5, . . . hours (the unit of t can be defined as, for example, 12 hours) is calculated. These are the infectious rates from the time a user is infected with the information.

5. Given an initial phase of a single spread, its future spread can then be predicted with the temporal network structure and the estimated contagion parameter (element 308 of FIG. 3). This is determined by building a reblog network, as described below.

Figure 3B:
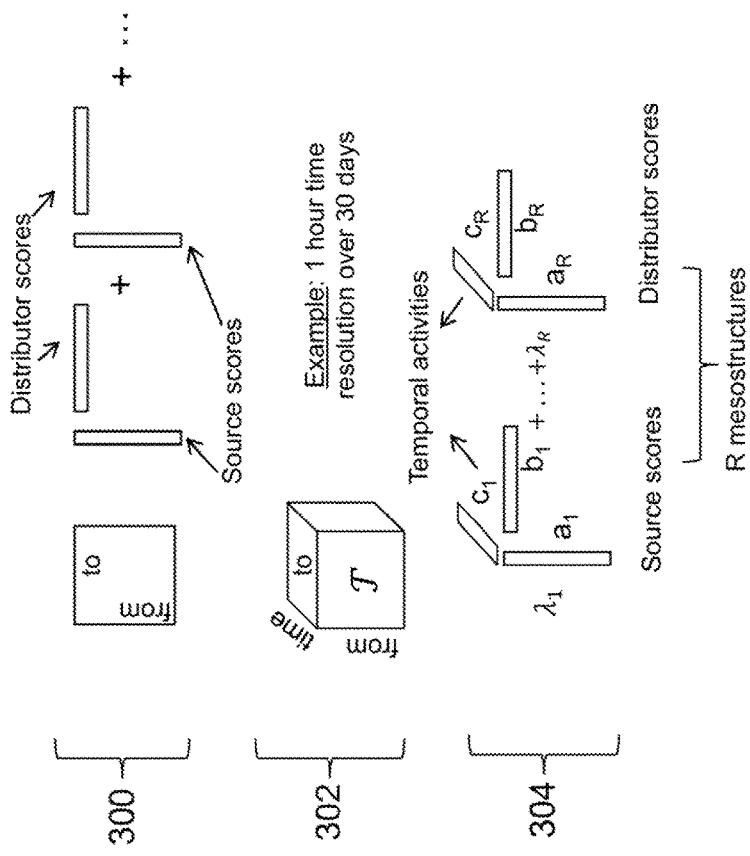
FIG. 3B is an illustration of inferring mesostructures according to some embodiments of the present disclosure.

Non-limiting examples of contagion models include SIS (Susceptible-Infected-Susceptible) (see Literature Reference No. 11 for a description of SIS) and SIR (Susceptible-infected-Resistant) discrete-time models. In a SIS model, each node on a network remains in a susceptible state until it is infected by one of its neighboring nodes. The infection of one node by an infected neighbor is a stochastic process in which, at a given time-point, the susceptible node has a probability $\beta$ of obtaining the infection, independent from infection from another infected neighboring node. The probability $\beta$ is called the spread rate of the infection. In addition, each node can be cured of the infection at any given time-point with probability $\delta$, the cure rate of the contagion. In this case, the node returns to a susceptible state. The SIR model differs from the SIS model in that when an infected node is cured it is placed in a resistant state, symbolizing an obtained immunity, in which it cannot be infected again in the future. FIG. 3B shows an illustrative representation of process steps 1-3.

(3.2) Experimental Studies

The method described herein was demonstrated on the Tumblr® microblogging platform. Tumblr® is a content-rich microblogging and social media platform, where users create and share posts that are of interest to them. Each Tumblr® user owns a blog, which contains all the posts from the user and serves as the gateway to follow others. Tumblr® primarily works with seven types of posts: text posts, photo posts, quote posts, link posts, chat posts, audio posts, and video posts, which are generally common among social media sites. As can be appreciated by one skilled in the art, Tumblr® is provided only as a non-limiting example of a social media platform. Any suitable information network could be used with the system according to embodiments of the present disclosure.

Figure 4:
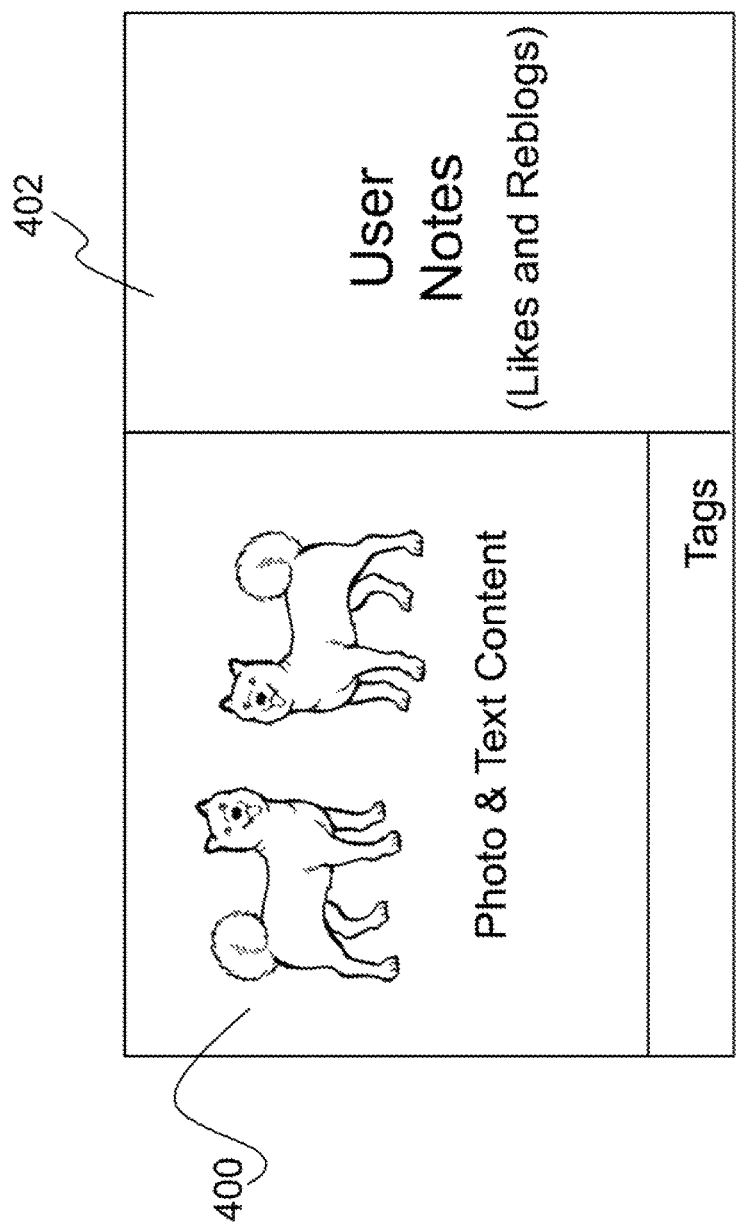
FIG. 4 is an illustration of an example social media photo post with text according to some embodiments of the present disclosure.

Each Tumblr® user can create a new post on their blog. Once a post is created, it can be published using one of the privacy control options. Unless the post is set to private, it is public and visible to other users. There are two types of actions, like and reblog, which can be applied on the post by other users. The former is similar to Twitter® favorites and marks what a user likes. The latter is similar to a Twitter® retweet and will clone the post to the blog of the acting user. The two actions are commonly referred as "notes" on Tumblr®. FIG. 4 depicts an example of a Tumblr® photo post 400. User activities (i.e., user notes 402) include both likes and reblogs. Users who "liked" and "reblogged" this post are displayed on the right pane (element 402).

The Tumblr® data was obtained over a 30 day period between Nov. 1, 2014 and Nov. 30, 2014 via GNIP "firehose" (the complete stream of all posts). During this period, every public activity on Tumblr® posts (including publish, like, and reblog activities) was delivered to the system according to embodiments of the present disclosure in real-time encapsulated as a JSON (JavaScript Object Notation) record.

Based on the data, a reblog network was generated, with users as vertices and weighted directed edges corresponding to reblogs. That is, if user i reblogs user j for w times, then there is a directed edge from i to j with weight w. Note that in the generated reblog network, users who generate popular content will have a high in-degree, while users who primarily share content will have a high out-degree (or vice versa depending on the definition). To reduce noise, the nodes were first sorted by degree distribution. Subsequently, an edge was only kept in the network if both ends of the nodes were among the top 100,000 users (based on their degrees). There was a total of 99,995 unique users in the resulting network.

From 99,995 Tumblr® users, an adjacency matrix was created, and the top 10,000 users was determined as described in step 1 of the methodology section above. Then, an adjacency tensor of dimension 10,000×10,000×720 (as described in step 2 of methodology) was created, where there were 720 time intervals during 30 days with a time resolution of one hour. The tensor decomposition was performed with the publicly available software, Matlab Tensor Toolbox (see Literature Reference No. 8). The sparse tensor is represented with the sptensor.m function and decomposed with the parafac_als.m function with R=20. For example, the vectors from the first three mesostructures (with the largest singular values) are show in determined. The source scores (e.g., vector a) and distributor scores (e.g., vector b) are distinct for each mesostructure/component, because the reblogging activities are directional. The time activities (e.g., vector c) for different mesostructures are also very distinct, as expected, to capture different types of activity level patterns in different mesostructures.

Qualitative analysis was then performed. In one embodiment, the top five mesostructures are analyzed, according to the singular values from the rank-1 tensor decomposition (i.e., $\lambda_r$ for r=1, . . . , R). For each mesostructure, the contents of the major users, which are those with the highest source scores and distributor scores, are analyzed. Then, similarity in content was analyzed. Content can include text and/or images from a social media platform (e.g., Tumblr®). As a non-limiting example, the top five mesostructures found in the described experimental study were categorized by humor, Troyler, Portuguese, Turkish, and jokes.

The quantitative analysis performed suggested that mesostructure reveals spatial structures and captures information propagation of key components, such as content category, language, and user location. The method described herein automatically infers the evolving structure (i.e., how information spreads) of large networks without the need to process meta data, such as the information contents (e.g., text, images). The method also does not impose constraints on the type of temporal activities. Activities can range from periodic to bursting. Examples of periodic activities include activities that occur weekly or at a certain time each day. Bursting activities happen at a random time (i.e., without any pattern).

A potential commercial application of the system according to embodiments of the present disclosure is identifying top nodes of a network to inject ideas that could potentially result in large cascades in order to spread certain ideas regarding a commercial product or a positive image of a company. Top nodes are determined by step 1 of section (3.1) above. The top nodes are then selected according to the nodes with the highest x % source scores or distributor scores.

For instance, a top node (user) could be provided a commercial product and asked to write a review of the commercial product. This could be beneficial for many companies, because top nodes can spread information much more efficiently than other nodes. Furthermore, after identifying user accounts associated with top nodes, product or marketing data can be transmitted to the user accounts of the top nodes. For instance, preconfigured packets of data regarding a commercial product can be transmitted to the top node. After identifying top nodes within the network, the top nodes (through the user accounts) can be influenced regarding a commercial product, such that the top nodes will advocate (or support or adopt) the commercial product and influence other users in the network to adopt the commercial product through transmission of data related to the commercial product (e.g., advertisements, images, videos, coupons, offers) to other users of the network.

Additionally, finding a mesostructure of specific interesting topics can also be helpful for spreading information efficiently. Therefore, the invention described herein can be applied to deliver more relevant and engaging contents and ideas in a proactive manner for a company.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for analyzing network activities in a network comprising interacting nodes, the system comprising:
   one or more processors and a non-transitory computer-readable medium having executable instructions encoded thereon such that when executed, the one or more processors perform operations of:
   representing each pair of node interactions between nodes in the network with a tensor, wherein the nodes represent users in the network;
   for each pair of node interactions, inferring a mesostructure using tensor decomposition of the tensor, resulting in a plurality of inferred mesostructures;
   determining a temporal network structure representing each pair of node interactions using a set of parameters generated from the tensor decomposition, resulting in a plurality of temporal network structures;
   predicting at least one future data cascade in the network using the plurality of temporal network structures;
   identifying at least one too node in the network; and
   influencing the user associated with the at least one top node to advocate a commercial product to the other users in the network.

2. The system as set forth in claim 1, wherein the network is a social network, and wherein the one or more processors further perform an operation of analyzing data generated by social network activities of users of the social network to predict future data spread in the social network.

3. The system as set forth in claim 1, wherein the one or more processors further perform operations of:
   converting a set of node interactions between N nodes into an N×N adjacency matrix with an $ij^{th}$ entry representing a number of times data propagates from a node i to a node j;
   rescaling the adjacency matrix;
   applying a singular value decomposition to the rescaled adjacency matrix to approximate the rescaled adjacency matrix as a sum of rank-1 matrices; and
   identifying a subset of nodes $\tilde{N}$ in the network having the highest percentage of node interactions.

4. The system as set forth in claim 3, wherein the one or more processors further perform operations of:
   generating an $\tilde{N} \times \tilde{N} \times T$ tensor $\mathcal{T}$ of node interactions, wherein a tensor $\mathcal{T}_{ijk}$ represents a number of times data propagates from node i to node j during time interval k, and T is a total number of time intervals;
   rescaling the tensor $\mathcal{T}$; and
   applying rank-1 tensor decomposition to the rescaled tensor $\tilde{\mathcal{T}}$ to approximate the rescaled tensor $\tilde{\mathcal{T}}$ as a sum of rank-1 tensors.

5. The system as set forth in claim 1, wherein each inferred mesostructure provides a score of each node as a source node and as a distributor node, wherein a source node represents a creator of new data, and a distributor node represents a propagator of the new data.

6. The system as set forth in claim 1, wherein the one or more processors further perform an operation of generating a cascade prediction model based on at least one of the plurality of inferred mesostructures.

7. A computer program product for analyzing network activities in a network comprising interacting nodes, the computer program product comprising:
   a non-transitory computer-readable medium having executable instructions encoded thereon, such that upon execution of the instructions by one or more processors, the one or more processors perform operations of:
   representing each pair of node interactions between nodes in the network with a tensor, wherein the nodes represent users in the network;
   for each pair of node interactions, inferring a mesostructure using tensor decomposition of the tensor, resulting in a plurality of inferred mesostructures;
   determining a temporal network structure representing each pair of node interactions using a set of parameters generated from the tensor decomposition, resulting in a plurality of temporal network structures;
   predicting at least one future data cascade in the network using the plurality of temporal network structures;
   identifying at least one top node in the network; and
   influencing the user associated with the at least one top node to advocate a commercial product to the other users in the network.

8. The computer program product as set forth in claim 7, wherein the network is a social network, and wherein the one or more processors further perform an operation of analyzing data generated by social network activities of users of the social network to predict future data spread in the social network.

9. The computer program product as set forth in claim 7, further comprising instructions for causing the one or more processors to perform operations of:

converting a set of node interactions between N nodes into an N×N adjacency matrix with an $ij^{th}$ entry representing a number of times data propagates from a node i to a node j;

rescaling the adjacency matrix;

applying a singular value decomposition to the rescaled adjacency matrix to approximate the rescaled adjacency matrix as a sum of rank-1 matrices; and identifying a subset of nodes $\tilde{N}$ in the network having the highest percentage of node interactions.

10. The computer program product as set forth in claim 9, further comprising instructions for causing the one or more processors to perform operations of:

generating an $\tilde{N} \times \tilde{N} \times T$ tensor $\mathcal{T}$ of node interactions, wherein a tensor $\mathcal{T}_{ijk}$ represents a number of times data propagates from node i to node j during time interval k, and T is a total number of time intervals;

rescaling the tensor $\mathcal{T}$; and applying rank-1 tensor decomposition to the rescaled tensor $\tilde{\mathcal{T}}$ to approximate the rescaled tensor $\tilde{\mathcal{T}}$ as a sum of rank-1 tensors.

11. The computer program product as set forth in claim 7, wherein each inferred mesostructure provides a score of each node as a source node and as a distributor node, wherein a source node represents a creator of new data, and a distributor node represents a propagator of the new data.

12. The computer program product as set forth in claim 7, further comprising instructions for causing the one or more processors to further perform an operation of generating a cascade prediction model based on at least one of the plurality of inferred mesostructures.

13. A computer implemented method for analyzing network activities in a network comprising interacting nodes, the method comprising an act of:

causing one or more processors to execute instructions encoded on a non-transitory computer-readable medium, such that upon execution, the one or more processors perform operations of:

representing each pair of node interactions between nodes in the network with a tensor, wherein the nodes represent users in the network;

for each pair of node interactions, inferring a mesostructure using tensor decomposition of the tensor, resulting in a plurality of mesostructures;

determining a temporal network structure representing each pair of node interactions using a set of parameters generated from the tensor decomposition, resulting in a plurality of temporal network structures;

predicting at least one future data cascade in the network using the plurality of temporal network structures;

identifying at least one too node in the network; and influencing the user associated with the at least one too node to advocate a commercial product to the other users in the network.

14. The method as set forth in claim 13, wherein the network is a social network, and wherein the one or more processors further perform an operation of analyzing data generated by social network activities of users of the social network to predict future data spread in the social network.

15. The method as set forth in claim 13, wherein the one or more processors further perform operations of:

converting a set of node interactions between N nodes into an N×N adjacency matrix with an $ij^{th}$ entry representing a number of times data propagates from a node i to a node j;

rescaling the adjacency matrix;

applying a singular value decomposition to the rescaled adjacency matrix to approximate the rescaled adjacency matrix as a sum of rank-1 matrices; and identifying a subset of nodes $\tilde{N}$ in the network having the highest percentage of node interactions.

16. The method as set forth in claim 15, wherein the one or more processors further perform operations of:

generating an $\tilde{N} \times \tilde{N} \times T$ tensor $\mathcal{T}$ of node interactions, wherein a tensor $\mathcal{T}_{ijk}$ represents a number of times data propagates from node i to node j during time interval k, and T is a total number of time intervals;

rescaling the tensor $\mathcal{T}$; and applying rank-1 tensor decomposition to the rescaled tensor $\tilde{\mathcal{T}}$ to approximate the rescaled tensor $\tilde{\mathcal{T}}$ as a sum of rank-1 tensors.

17. The method as set forth in claim 13, wherein each inferred mesostructure provides a score of each node as a source node and as a distributor node, wherein a source node represents a creator of new data, and a distributor node represents a propagator of the new data.

18. The method as set forth in claim 13, wherein the one or more processors further perform an operation of generating a cascade prediction model based on at least one of the inferred mesostructures.

* * * * *